United States Patent
Sasakura et al.

(10) Patent No.: US 9,092,381 B2
(45) Date of Patent: Jul. 28, 2015

(54) SERVER, COMMUNICATION TERMINAL, AND DEVICE COLLABORATION SYSTEM INCLUDING THE SAME

(75) Inventors: Shuhei Sasakura, Osaka (JP); Katsuyuki Morita, Osaka (JP); Eiji Fukumiya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 322 days.

(21) Appl. No.: 13/618,007

(22) Filed: Sep. 14, 2012

(65) Prior Publication Data

US 2013/0013692 A1   Jan. 10, 2013

Related U.S. Application Data

(63) Continuation of application No. PCT/JP2011/005309, filed on Sep. 21, 2011.

(30) Foreign Application Priority Data

Nov. 12, 2010  (JP) ................................. 2010-253587

(51) Int. Cl.
  *G06F 15/16* (2006.01)
(52) U.S. Cl.
  CPC ..................................... *G06F 15/16* (2013.01)
(58) Field of Classification Search
  CPC ...... H04N 7/16; H04N 21/6543; H04H 60/80
  USPC ...................................................... 709/204
  See application file for complete search history.

(56) References Cited

U.S. PATENT DOCUMENTS

| | | | |
|---|---|---|---|
| 2003/0046164 A1 | 3/2003 | Sato et al. | |
| 2005/0203991 A1* | 9/2005 | Kawamura et al. | 709/203 |
| 2006/0168635 A1 | 7/2006 | Terashima et al. | |
| 2009/0300108 A1* | 12/2009 | Kohno | 709/203 |
| 2010/0145514 A1 | 6/2010 | Kim et al. | |
| 2010/0235876 A1 | 9/2010 | Kurihara et al. | |

FOREIGN PATENT DOCUMENTS

| | | |
|---|---|---|
| JP | 2001-339691 | 12/2001 |
| JP | 2002-169737 | 6/2002 |
| JP | 2002-278886 | 9/2002 |

(Continued)

OTHER PUBLICATIONS

NTT Technical Review 2006, vol. 18, No. 6, pp. 34-37—with a partial translation.

(Continued)

*Primary Examiner* — David Lazaro
*Assistant Examiner* — Zia Khurshid
(74) *Attorney, Agent, or Firm* — Hamre, Schumann, Mueller & Larson, P.C.

(57) ABSTRACT

A device collaboration system includes a server 1 that manages contents, a main communication terminal 10 capable of making access to the server 1 via a network and reproducing a content, and an auxiliary communication terminal 20 capable of making access to the server via the network 30. The server monitors a reproduction state of a content reproduced by the main communication terminal 10, and when the main communication terminal 10 reproduces a predetermined portion in the content, the server controls an action by the auxiliary communication terminal 20.

19 Claims, 11 Drawing Sheets

(56) References Cited

FOREIGN PATENT DOCUMENTS

| JP | 2003-067629 | 3/2003 |
|----|-------------|--------|
| JP | 2003-141017 | 5/2003 |
| JP | 2003-289506 | 10/2003 |
| JP | 2006-196956 | 7/2006 |
| JP | 2008-252662 | 10/2008 |
| JP | 2010-131748 | 6/2010 |
| JP | 2010-246094 | 10/2010 |

OTHER PUBLICATIONS

NTT Technical Review 2003, vol. 15, No. 8, pp. 37-40—with a partial translation.

* cited by examiner

| Content information of novel A ||
|---|---|
| Transmission timing | Contents of message |
| Page 5 | |
| Page 15 | |
| Page 32 | |
| Page 34 | |
| Page 122 | |
| Page 130 | |

FIG. 5

| Content information of novel A |||
| --- | --- | --- |
| Transmission trigger | Contents of message | Transmission requirement code |
| Page 5 | | TM01 |
| Page 15 | | TM02 |
| Page 32 | | TM03 |
| Page 34 | | TM04 |
| Page 122 | | TM06 |
| Page 130 | | TM07 |

| Content information of novel A ||
| --- | --- |
| Transmission requirement code | Transmission requirement |
| TM01 | 1 minute elapses after content reproduction end |
| TM02 | 15 seconds elapses after communication disconnection |
| TM03 | 0 o'clock at midnight |
| TM04 | While logging in SNS |
| TM05 | When user is at home |
| TM06 | Distance between content watching terminal and portable telephone terminal is 10 m or less |
| TM07 | temperature: 25°C or above, humidity: 70 % or more, and precipitation amount per hour: 30 mm or more |

SERVER, COMMUNICATION TERMINAL, AND DEVICE COLLABORATION SYSTEM INCLUDING THE SAME

BACKGROUND

1. Field

The present invention relates to a device collaboration system focusing on contents. The present invention relates to a server and a communication terminal included in a device collaboration system.

2. Description of Related Art

The Patent Document 1 discloses a terminal unit that includes a scenario storage means for storing scenarios described with operation instructions for cooperatively operating a plurality of network apparatuses; a command storage means for storing a series of control instructions for terminating the operation instructions; a communication means for carrying out communication with the network apparatuses and a user terminal; a scenario start means for detecting the occurrence of an event and reading and starting the scenario associated with this event from the scenario storage means; and a connection apparatus control means for reading a series of the control instructions from the command storage means on the basis of the scenario started by the scenario start means and transmitting the series of control instructions to the network apparatuses via the communication means.

3. Prior Art Document

[Patent Document 1] JP2006-196956A

In the configuration disclosed in the Patent Document 1, a control instruction corresponding to an event is set by a user, and therefore, this means that a controlling action corresponding to the event has been known to the user. In the case where, for example, such a device collaboration technology as disclosed in the Patent Document 1 is to be used for increasing the enjoyment felt by a user, if the occurrence of a phenomenon that the user has not expected is felt as enjoyment by the user, the configuration disclosed in Patent Document 1 cannot increase the enjoyment felt by the user.

SUMMARY

A device collaboration system disclosed in the present application includes a server, a first communication terminal capable of reproducing a content, and a second communication terminal capable of receiving a control signal transmitted from the server, wherein the server monitors a reproduction state of the content reproduced by the first communication terminal, and when detecting that the first communication terminal has reproduced a predetermined portion in the content, the server transmits the control signal to the second communication terminal.

A server disclosed in the present application is a server that is able to communicate with a first communication terminal capable of reproducing a content and a second communication terminal capable of receiving a control signal, wherein the server monitors a reproduction state of the content reproduced by the first communication terminal, and when detecting that the first communication terminal has reproduced a predetermined portion in the content, the server transmits the control signal to the second communication terminal.

A communication terminal disclosed in the present application includes: a content reproduction section capable of reproducing a content; and a reproduction progress transmission section that transmits, to a server, information about a progress in reproduction of a content that is being reproduced by the content reproduction section.

A device collaboration system disclosed in the present application is a device collaboration system that includes a server and a communication terminal capable of reproducing a content, wherein the server includes: a monitor section that monitors whether or not the communication terminal has reproduced a predetermined portion of a content; a storage section that stores instruction information in a state of being associated with a transmission requirement when the monitor section detects that the communication terminal has reproduced the predetermined portion of the content, the instruction information indicating instruction contents for causing the communication terminal to execute a specific action; and a transmission section that transmits a control signal based on the instruction information stored in the storage section to the communication terminal, in response to satisfaction of the associated transmission requirement, wherein the communication terminal executes the specific action based on the control signal from the server.

A device collaboration system disclosed in the present application is a device collaboration system that includes a server, a first communication terminal capable of reproducing a content, and a second communication terminal capable of receiving a control signal transmitted from the server, wherein the server includes: a monitor section that monitors whether or not the first communication terminal has reproduced a predetermined portion of a content; a storage section that stores instruction information in a state of being associated with a transmission requirement when the monitor section detects that the first communication terminal has reproduced the predetermined portion of the content, the instruction information indicating instruction contents for causing the second communication terminal to execute a specific action; and a transmission section that transmits a control signal based on the instruction information stored in the storage section to the second communication terminal, in response to satisfaction of the associated transmission requirement, wherein the second communication terminal executes the specific action based on the control signal from the server.

A device collaboration system disclosed in the present application is a device collaboration system that includes a server and a communication terminal capable of reproducing a content, wherein the server includes: a monitor section that monitors whether or not the communication terminal has reproduced a predetermined portion of a content; and a transmission section that transmits a control signal and a transmission requirement to the communication terminal when the monitor section detects that the communication terminal has reproduced the predetermined portion of the content, the control signal indicating instruction contents for causing the communication terminal to execute a specific action, wherein the communication terminal executes the specific action based on the control signal from the server, in response to satisfaction of the transmission requirement.

A device collaboration system disclosed in the present application is a device collaboration system that includes a server, a first communication terminal capable of reproducing a content, and a second communication terminal capable of receiving a control signal transmitted from the server, wherein the server includes: a monitor section that monitors whether or not the first communication terminal has reproduced a predetermined portion of a content; and a transmission section that transmits a control signal and a transmission requirement to the second communication terminal when the monitor section detects that the first communication terminal has reproduced the predetermined portion of the content, the control signal indicating instruction contents for causing the second communication terminal to execute a specific action, wherein the second communication terminal executes the specific action based on the control signal from the server, in response to satisfaction of the transmission requirement.

BRIEF DESCRIPTION OF THE DRAWINGS

The figures depict one or more implementations in accordance with the present teachings, by way of example only, not by way of limitations. In the figures, like reference numerals refer to the same or similar elements.

FIG. 5 is management diagram for content information managed by a server.

FIG. 9 is a management diagram for content information managed by a server in Modification Example 1.

FIG. 10 is a management diagram for transmission requirement information managed by the server in Modification Example 1.

DETAILED DESCRIPTION OF THE INVENTION

In the following detailed description, numerous specific details are set forth by way of examples in order to provide a thorough understanding of the relevant teachings. However, it should be apparent to those skilled in the art that the present teachings may be practiced without exemplary details. In other instances, well known methods, procedures, components, and/or circuitry have been described at a relatively high-level, without detail, in order to avoid unnecessarily obscuring aspects of the present concepts.

Embodiment 1

1. Configuration of Device Collaboration System

The following description explains a device collaboration system (hereinafter referred to as a "system" in some cases) according to the present embodiment.

The following description refers mainly to an electronic book as a content dealt with by the present system, but the present configuration is applicable in some cases to contents of other types (music, moving images, newspapers, games, etc.). The application to contents of other types will be explained as required. Further, "reproduction" in the following description refers to actions, for example, an action of causing a content composed of images, such as an electronic book or a newspaper, to be displayed on a display section of a content watching terminal; an action of causing a content composed of sounds, such as music, to be output with sounds by a content watching terminal; and an action of causing a content composed of images and sounds, such as a moving image or a game, to be output with images and sounds by a content watching terminal.

Figure 1:
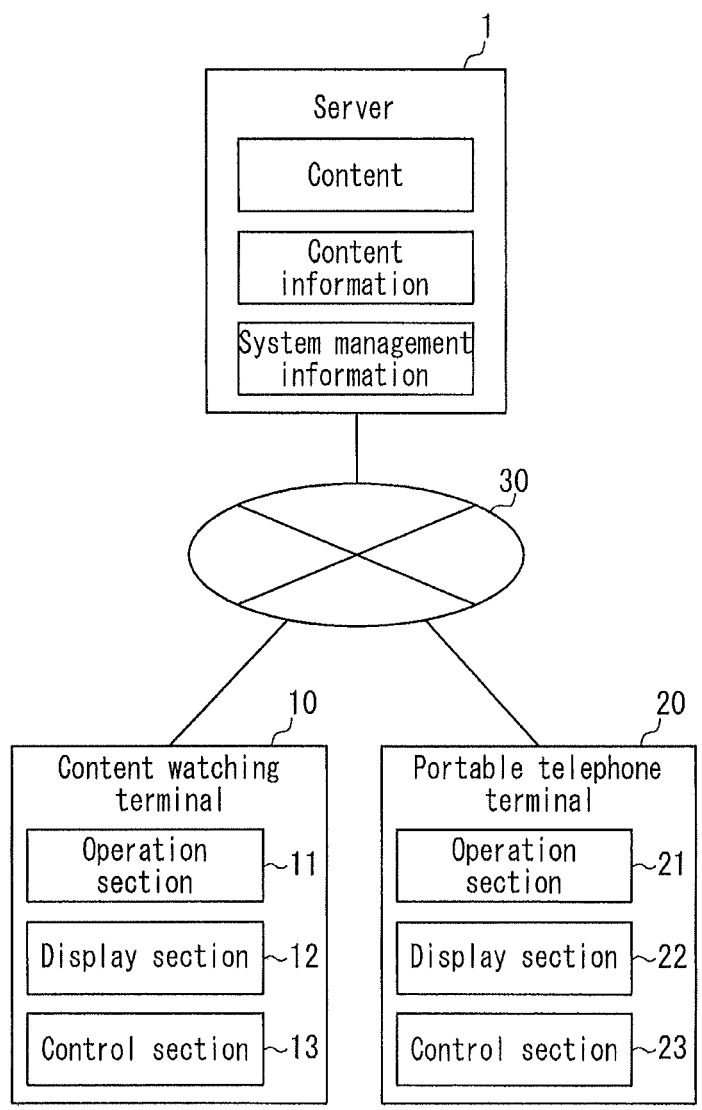
FIG. 1 is a block diagram of a device collaboration system.
Figure 2:
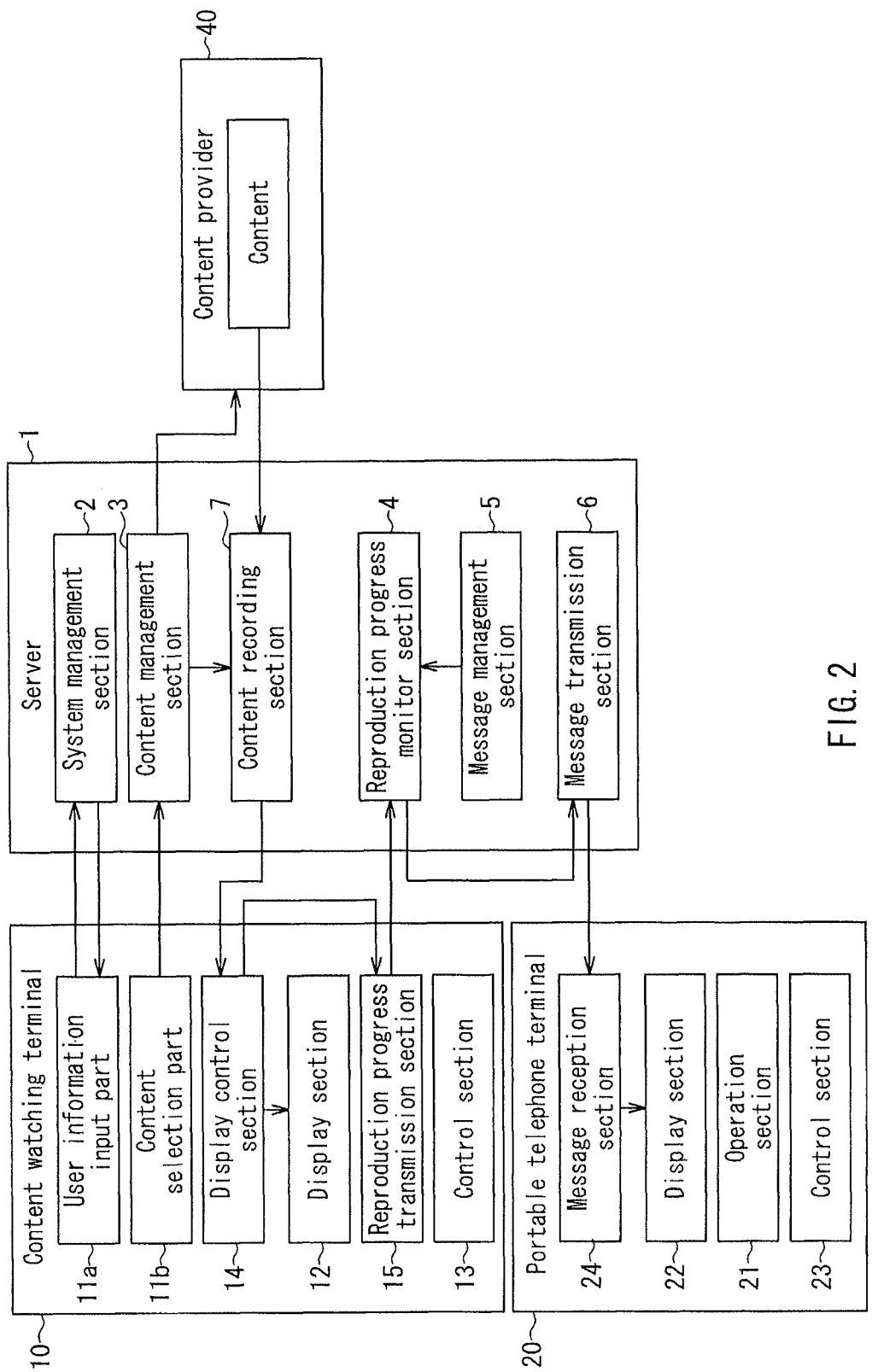
FIG. 2 is a block diagram showing a detailed configuration of the device collaboration system.

FIG. 1 is a block diagram showing an outline of a device collaboration system according to the present embodiment. FIG. 2 is a block diagram showing a detailed configuration of a device collaboration system. The configuration shown in FIGS. 1 and 2 is an exemplary configuration of a device collaboration system.

As shown in FIGS. 1 and 2, the device collaboration system includes a server 1, a content watching terminal 10, and a portable telephone terminal 20. The server 1, the content watching terminal 10, and the portable telephone terminal 20 are connected via a network 30 with one another. The content watching terminal 10 and the portable telephone terminal 20 are possessed by a single user. It should be noted that the number of the content watching terminal and the number of the portable telephone terminal shown in FIG. 1 are exemplary. The network 30 can be realized with, for example, the Internet, a LAN (Local Area Network), or a WAN (Wide Area Network). It should be noted that the content watching terminal 10 and the portable telephone terminal 20 may be formed as a single terminal.

The server 1 includes a system management section 2, a content management section 3, a reproduction progress monitor section 4, a message management section 5, a message transmission section 6, and a content recording section 7, as shown in FIG. 2. The server 1 can be realized with a SNS (Social Network Service) server.

The system management section 2 manages system management information including information for managing users who make access to the server 1 using content watching terminals 10 and portable telephone terminals 20.

The content management section 3 manages, for example, a content provided by a content provider 40, and content information about the content. The content may be stored in the content recording section 7, or may be obtained from the content provider 40 when a reproduction request sent from the content watching terminal 10 is received. The content information is information such as title information about a title of a content recorded in the content recording section 7, the number of pages in total (a total reproduction time, or the like, in the case where the content is a moving image, or sounds). The content information is recorded in the content recording section 7.

The reproduction progress monitor section 4 obtains reproduction progress information about reproduction of a content from a reproduction progress transmission section 15 (to be described later) of the content watching terminal 10, and refers to information about a transmission timing carried on message management information managed by the message management information 5. The reproduction progress monitor section 4 can send an instruction for transmission of a message to the message transmission section 6.

The message management section 5 manages, for example, message management information shown in FIG. 5.

The message transmission section 6 transmits a message to the portable telephone terminal 20, on the basis of a message transmission instruction sent from the reproduction progress monitor section 4.

The content recording section 7 can record a content obtained from the content provider 40. The content recording section 7 can be realized with a storage medium such as a hard disk drive, a semiconductor memory, or the like. The content recording section 7 is a part of a storage region of a storage medium, and the following, in addition to the content, can be recorded in the storage medium: content information; system management information; message management information; and the like. When receiving a reproduction request for reproduction of an arbitrary content from the content management section 3, the content recording section 7 transmits the content designated by the reproduction request to a display control section 14 (to be described later) of the content watching terminal 10.

The content watching terminal 10 can be connected to at least the network 30, as is the case with an information communication terminal, a portable telephone terminal, a personal computer, etc., and can be realized with a terminal that is capable of reproducing a content. In the content watching terminal 10 in the present embodiment, an operating system and a content reproduction application that can work on the operating system are installed, so that a content can be reproduced on the content reproduction application. The configuration, however, may be realized with another software configuration as long as a content can be reproduced. The content watching terminal 10 includes, for example, an operation section 11, a display section 12, and a control section 13, as shown in FIG. 1. More specifically, the content watching section 10 includes the operation section 11, the display section 12, the control section 13, the display control section 14, and the reproduction progress transmission section 15, as shown in FIG. 2. The content watching terminal 10 may include a sound output control section that demodulates sound information contained in a content into sounds, a speaker that can output sounds demodulated by the sound output control section, and the like.

The operation section 11 can be realized with, for example, operation buttons, a touch panel, etc. The operation section 11 includes a user information input part 11a, and a content selection part 11b, as shown in FIG. 2. With the user information input part 11a, information about a user who uses the content watching terminal 10 and the portable telephone terminal 20 can be input. With the content selection part 11b, an operation for selecting an arbitrary content from a content list provided by the server 1 can be carried out.

The display section 12, controlled by the display control section 14, can display, for example, images based on image information contained in a content. In the present embodiment, the content watching terminal 10 is realized with an information communication terminal as an example, and it includes a touch panel as an example of the operation part 11, and a liquid crystal display panel as an example of the display section 12. The touch panel is provided in a state of being overlaid on the liquid crystal display panel, and a user can operate the touch panel, while viewing images displayed on the liquid crystal display panel.

The control section 13 controls respective sections in the content watching terminal 10.

The display control section 14 temporarily stores a content transmitted from the content recording section 7, and demodulates image information contained in the stored content into image signals that can be displayed on the display section 12. The display control section 14 transmits reproduction progress information to the reproduction progress transmission section 15 in the case where the action of transmitting image signals to the display section 12 progresses. The actions referred to as "the action of transmitting image signals to the display section 12" include an action of suspension of the transmission of image signals to the display section 12 that occurs due to stop page or temporary suspension of reproduction of a content. The display control section 14 may determine whether or not reproduction progress information is to be transmitted to the reproduction progress transmission section 15, based on an action described in a content or content information, or may transmit reproduction progress information corresponding to every reproduction progress to the reproduction progress transmission section 15. It should be noted that FIG. 2 shows a configuration that allows images based on image information contained in a content to be displayed on the display section 12, but in the case where the content watching terminal 10 is capable of dealing with a content containing sound information, the content watching terminal 10 includes a sound output control section, a speaker, etc., in addition to the configuration shown in FIG. 2.

The reproduction progress transmission section 15 receives reproduction progress information transmitted from the display control section 14, and transmits the reproduction progress information to the reproduction progress monitor section 4. It should be noted that in the present embodiment, the reproduction progress transmission section 15 is configured so as to receive reproduction progress information transmitted from the display control section 14, but alternatively the configuration may be such that the reproduction progress transmission section 15 transmits a transmission request for transmission of reproduction progress information to the display control section 14, and receives reproduction progress information transmitted by the display control section 14 in response to the request. The reproduction progress transmission section 15 may determine whether or not to transmit reproduction progress information to the reproduction progress monitor section 4, based on an action described in a content or content information, or alternatively, may transmit all reproduction progress information transmitted from the display control section 14 to the reproduction progress monitor section 4. In any case, a portion in a content corresponding to reproduction progress information is identified by the reproduction progress monitor section 4. In the case where the content is, for example, an electronic book, a portion in a content is a specific page or the like in the electronic book.

In the case where a content that is being reproduced is, for example, an electronic book, a transmission timing for transmitting reproduction progress information from the reproduction progress transmission section 15 to the reproduction progress monitor section 4 is a timing at which a user changes a page in an electronic book displayed on the display section 12, or the like, by operating the operation section 11, a timing described in timing information contained in content information, or the like. The "timing described in timing information" refers to, for example, a timing corresponding to a paragraph or a chapter, a timing at which reproduction of a plurality of pages is completed, or the like. The "timing corresponding to a paragraph or a chapter" refers to, for example, a timing at which a user clicks an arbitrary paragraph or chapter, a timing at which a user causes an arbitrary paragraph or chapter to be enlarged by using a zooming function as one function of a content reproduction application, or the like. Further, in the case where a content that is being reproduced is a moving image, the reproduction progress transmission section 15 is capable of transmitting reproduction progress information to the reproduction progress monitor section 4 at a timing in synchronization with a chapter (a division inserted between scenes of a moving image) contained in content information, a timing in synchronization with a preliminarily-set reproduction time (an elapsed time from a start of reproduction of one moving image) contained in content information, a timing in synchronization with a preliminarily-set frame number contained in content information, or the like. In the case where a content that is being reproduced is music, the reproduction progress transmission section 15 is capable of transmitting reproduction progress information to the reproduction progress monitor section 4 at a timing at which reproduction of one or a plurality of pieces of music ends, a timing in synchronization with a preliminarily-set reproduction time (an elapsed time from a start of reproduction of one piece of music) contained in content information, or the like. In the case where reproduction progress information is transmitted at a timing at which reproduction of one or a plurality of pieces of music ends, reproduction progress information is preferably transmitted only in the case where a fast-forwarding operation is not carried out during the reproduction of the piece. In the case where a content is a game, the reproduction progress transmission section 15 is capable of transmitting reproduction progress information to the reproduction progress monitor section 4, at a timing at which the progress of the game (a level of strength of a user in the game, a stage that a user reaches, etc.) reaches a preliminarily set point, a timing at which a score obtained by a user in the game reaches a preliminarily set level, a timing at which a current position of the content watching terminal 10 reaches a preliminarily set position, or the like. It should be noted that in the case where reproduction progress information is transmitted at a timing based on a current position, the content watching terminal 10 has to have a position detection system such as a GPS antenna installed therein.

It should be noted that a reproduction progress transmission action by the reproduction progress transmission section 15 can admit or prohibit transmission by, for example, using an action setting function such as a content reproduction application that is operating in the content watching terminal 10. Further, the transmission/non-transmission setting of reproduction progress information may be set per user. In this case, the reproduction progress transmission section 15 refers to a transmission/non-transmission setting per user and reproduction progress information transmitted from the display control section 14, and prohibits transmission to the reproduction progress monitor section 4 of reproduction progress information that is prohibited from being transmitted. The content watching terminal 10 preferably has a function of causing the display section 12 to display a warning message of "not to collaborate with portable telephone" or the like, in the case where the transmission/non-transmission setting of reproduction progress information is set to "prohibition".

It should be noted that in the case where the content watching terminal 10 and the portable telephone terminal 20 are formed as one terminal, the content watching terminal 10 has to include respective functional sections of the portable telephone terminal 20 described later.

The portable telephone terminal 20 is capable of at least data communication. The portable telephone terminal 20, when being positioned in a communication area, is preferably in a state of being capable of constant data communication with the server 1. The portable telephone terminal 20 includes, for example, an operation section 21, a display section 22, a control section 23, and a message reception section 24, as shown in FIG. 2. The operation section 21 can be realized with, for example, operation buttons, or a touch panel. The display section 22 can display, for example, a message transmitted from the server 1. The control section 23 can control respective sections of the portable telephone terminal 20. The message reception section 24 receives a message transmitted from the server 1, and executes a controlling operation for causing it to be displayed on the display section 22. The portable telephone terminal 20 further may include a speaker capable of outputting a ring tone or the like with sounds, a vibration motor that vibrates the portable telephone terminal 20, etc. in addition to the configuration shown in FIG. 2. The portable telephone terminal 20 thus receives a message transmitted from the server 1 and causes it to be displayed on the display section 22, but alternatively, the portable telephone terminal 20 may reproduce the message with sounds via a telephone line controlled by the server 1. It should be noted that in the case where the content watching terminal 10 and the portable telephone terminal 20 are formed as one terminal, the portable telephone terminal 20 has to include the above-described respective functions of the content watching terminal 10.

The device collaboration system according to the present embodiment is a system capable of distributing a content using alternate reality in order to increase enjoyment felt by a user. The alternate reality is achieved by sensately replacing a part of a virtual world such as an electronic book or an electronic game with reality by using information conveying means used by a user daily, such as a telephone, thereby causing a user to feel a boundary between the virtual world and the real world ambiguous (providing an illusion). The following description explains actions of the present system.

Figure 3:
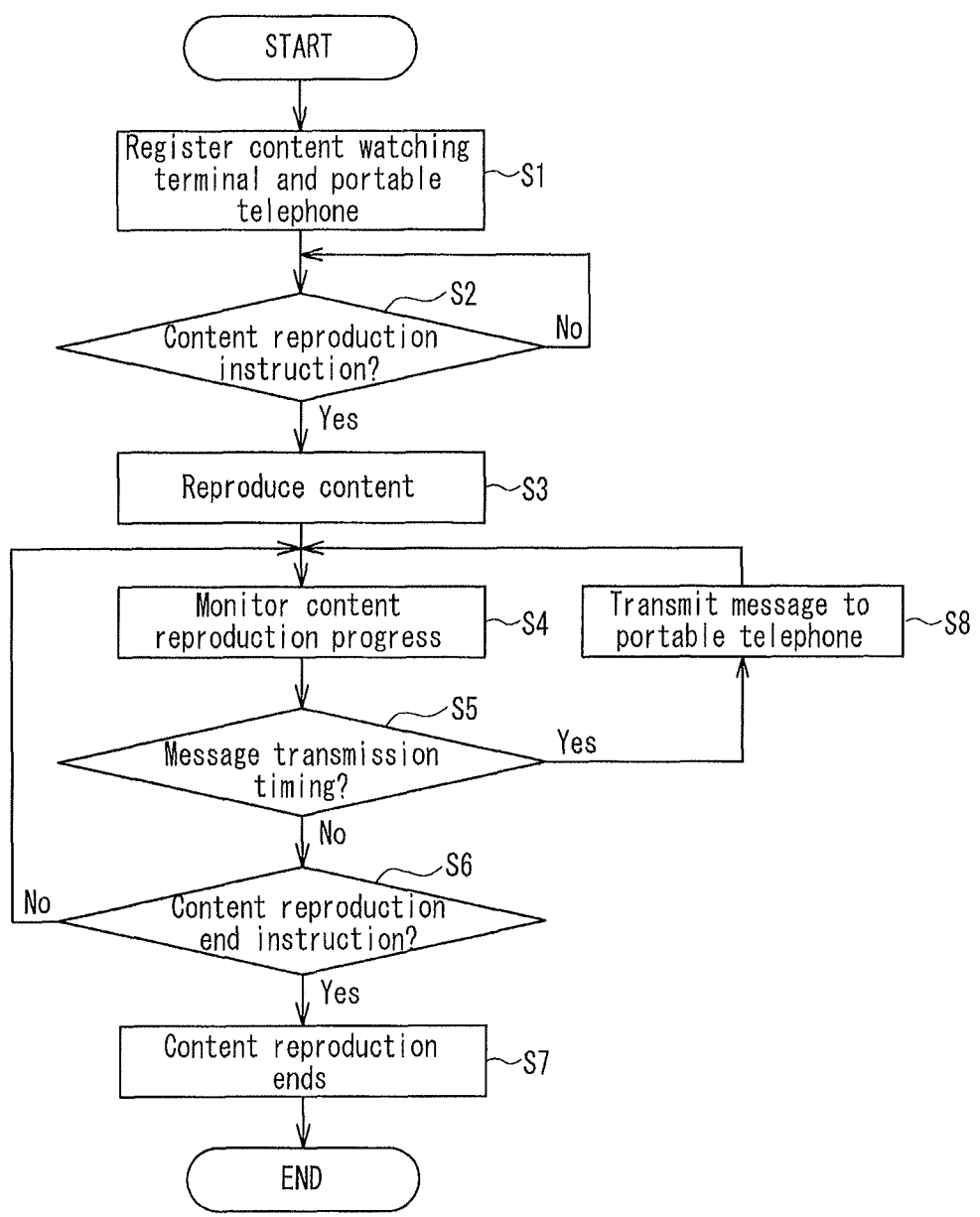
FIG. 3 is a flowchart showing basic actions of the device collaboration system.
Figure 4:
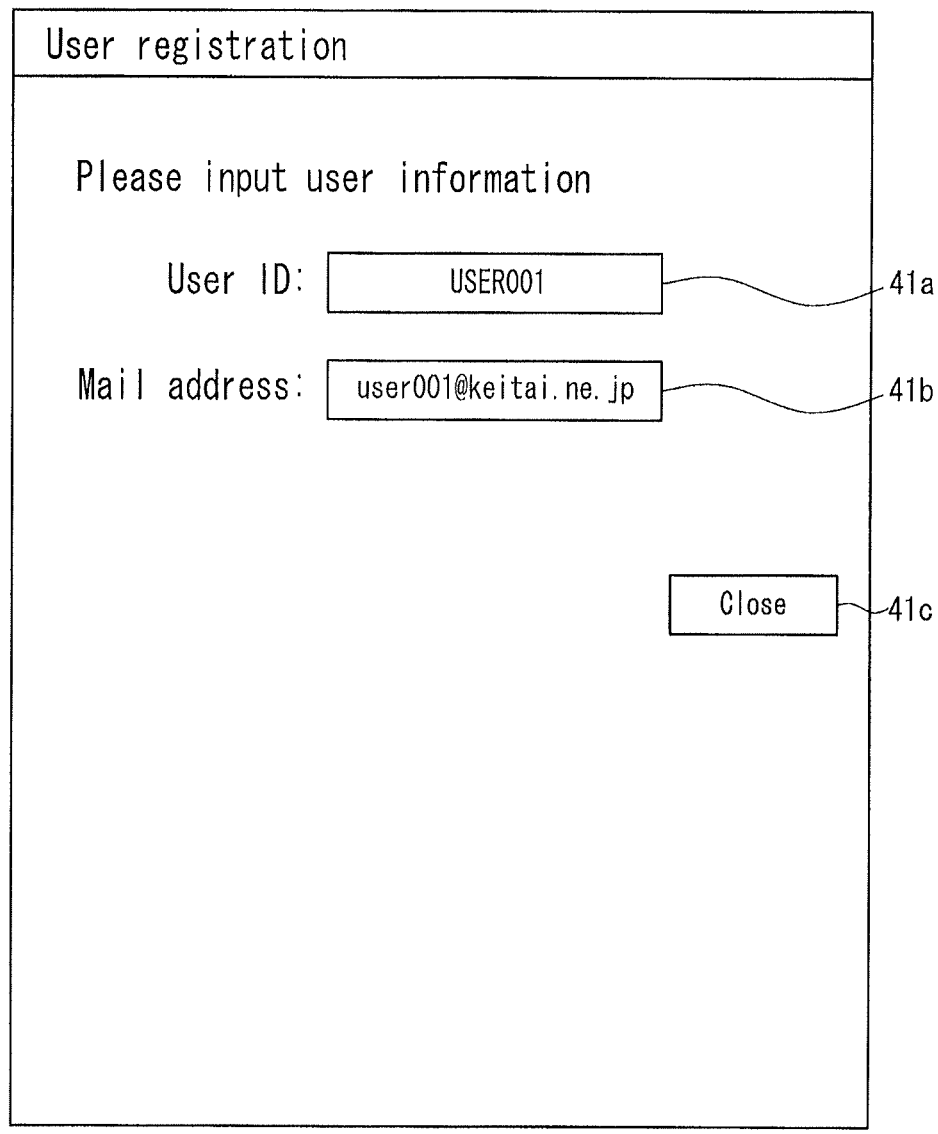
FIG. 4 schematically shows a window for user registration.

FIG. 3 shows an action flow of the server 1 in the present system. First, when a user uses the present system, the user has to make a user registration to the server 1. The user registration can be carried out by operating the content watching terminal 10 or the portable telephone terminal 20. FIG. 4 shows an exemplary user registration window. When the user makes a request for user registration to the server 1, for example, by operating the user information input part 11a of the content watching terminal 10, the system management section 2 of the server 1 causes the display section 12 of the content watching terminal 10 to display the user registration window shown in FIG. 4. Next, the user inputs information about him/herself by operating the user information input part 11a. Items input upon the user registration are, for example, a "user ID" and a "mail address" as shown in FIG. 4. The user ID can be set arbitrarily by the user, or can be given to the user by the server 1. The mail address is an address used upon transmission of a message from the server 1 to the portable telephone terminal 20. When the user operates the user information input part 11a of the content watching terminal 10 and inputs his/her user ID in an input area 41a, inputs his/her mail address in an input area 41b, and clicks an end button 41c, the user information thus input is transmitted to the server 1. The system management section 2 of the server 1 stores and manages the user information sent from the content watching terminal 10 as a part of system management information (S1). It should be noted that in the case where the portable telephone terminal 20 reproduces a message with sounds via a telephone line controlled by the server 1, it is necessary to input a "telephone number" of the portable telephone terminal 20 as user information.

It should be noted that in the case where the content watching terminal 10 is equipped with hardware such as a keyboard or a numerical keyboard, the input of characters into the input areas 41a and 41b can be carried out by using such hardware, but in the case where such hardware is not provided, the input can be carried out by using a software keyboard. The software keyboard is software with which a window carrying an image of a keyboard is displayed on a display section and arbitrary characters can be input by clicking arbitrary keys on the displayed keyboard image.

Next, the server 1 waits for transmission of a content reproduction instruction from the content selection part 11b of the content watching terminal 10. The method for inputting the content reproduction instruction at the content watching terminal 10 is, for example, a method in which the user selects an arbitrary content in a content list displayed on the display section 12 of the content watching terminal 10, and clicks a reproduction start button (not shown) displayed on the display section 12. With this click, the content selection part 11b transmits the content reproduction instruction to the server 1. It should be noted that the content list is transmitted to the content watching terminal 10 from the server 1, when an instruction of requesting the content list is input by the user at the content watching terminal 10 (S2).

Next, when the content management section 3 detects that a content reproduction instruction is transmitted from the content selection part 11b, the content control section 3 starts reproduction of the content designated by the user. More specifically, when detecting that the content reproduction instruction is transmitted from the content selection part 11b, the content management section 3 of the server 1 either makes a request for the content to the content provider 40 or sends a reproduction instruction to the content recording section 7. The content that is requested to the content provider 40 and is provided by the content provider 40 is recorded in the content recording section 7. Next, when receiving the reproduction instruction from the content management section 3, the content recording section 7 transmits the content designated in the reproduction instruction to the display control section 14 of the content watching terminal 10. The display control section 14 demodulates image information contained in the content sent from the content recording section 7 into image signals that can be displayed with the display section 12, and sends the image signals to the display section 12. The display section 12 displays images based on the image signals sent from the display control section 14. In the present embodiment, an exemplary content is an electronic book, and images of respective pages of the electronic book are displayed on the display section 12. It should be noted that in the case where sound information is contained in the content, sound signals are generated from sound information by an output control section (not shown), and sounds based on the sound signals are output from a speaker (not shown) (S3).

Next, when the content watching terminal 10 starts the reproduction of the content, the reproduction progress transmission section 15 monitors reproduction progress of the content. More specifically, the reproduction progress transmission section 15 detects, for example, information of a page that is being reproduced currently, which is transmitted from the display control section 14, and transmits the detected information about the reproduced page to the reproduction progress monitor section 4 of the server 1 (S4).

The present embodiment is configured so that the reproduction progress transmission section 15 transmits information about a currently reproduced page as a content reproduction progress to the server 1, but alternatively it may be configured so that the reproduction progress transmission section 15 detects a paragraph or a line in the text described in the electronic book and transmits it to the server 1. As the method for detecting a paragraph or a line in an electronic book, the following methods are available: a method of detecting that an arbitrary paragraph or line in an electronic book is clicked by the user; and a method of detecting that an arbitrary paragraph or line in an electronic book is enlarged by the user using a zooming function as one of functions of the content reproduction application.

Further, the present embodiment is configured so that the display control section 14 temporarily stores the content transmitted from the content recording section 7, but the configuration of temporarily storing the content in the content watching terminal 10 is not essential. In the case where the content watching terminal 10 does not have a configuration of temporarily storing the content, the content recording section 7 transmits the content to the content watching terminal 10 in synchronization with a content partial reproduction request sent from the content watching terminal 10 to the server 1. For example, in the case where the content watching terminal 10 reproduces an electronic book, the content watching terminal 10 sends a reproduction request for, for example, each page of an electronic book to the server 1, and receives and reproduces the content transmitted page by page from the server 1. In the case of such a configuration, the reproduction progress monitor section 4 may grasp a transmission action of transmitting the content from the content recording section 7 to the content watching terminal 10 as a content reproduction progress.

Next, the reproduction progress monitor section 4 refers to information about a reproduced page sent from the reproduction progress transmission section 15, and message management information held by the message management section 5 (S5).

FIG. 5 shows exemplary message management information. The message management information is created preliminarily by, for example, the content provider 40, per each content dealt with by the system, and is stored in a storage medium in the server 1. The message management information contains, for example, information about a transmission timing of a message, and contents of the message. It should be noted that specific exemplary contents of the message, the description of which is omitted herein, are actually, for example, character information. A message has contents relating to contents of the content. In the case where the content is an electronic book of a novel, contents of a message can be words spoken by characters, sound effects, etc described with characters in the message. Contents of a message are disclosed to the user when received and displayed by, for example, the portable telephone terminal 20 upon reproduction of contents, and such a configuration is preferable in which contents of a message are not disclosed to the user by a method other than the method of receiving and disclosing the same with the portable telephone terminal 20, so as to increase the enjoyment of the user.

It should be noted that contents of a message are not limited to characters, but may be images (moving images, still images), sounds, or the like, regardless of its form. For example, the configuration may be such that in the case where an electronic book of a novel is reproduced by the content watching terminal 10, the server 1 causes the display section 22 of the portable telephone terminal 20 to display images relating to contents of the novel, or causes a speaker provided in the portable telephone terminal 20 to output sounds such as sound effects relating to contents of the novel, or the like. In the case where contents reproduced are moving images, the configuration may be such that the server 1 causes the display section 22 of the portable telephone terminal 20 to display a commentary, a message or the like by an author with characters; causes the display section 22 of the portable telephone terminal 20 to display images of an arbitrary scene of a moving image; causes a speaker of the portable telephone terminal 20 to output words of characters appearing in a moving image, sound effects of a moving image, or the like. Further, in the case where the content being reproduced is music, the server 1 causes the display section 22 of the portable telephone terminal 20 to display characters describing lyrics, a commentary or the like by an author, and the like that correspond to a music piece; causes the display section 22 of the portable telephone terminal 20 to display images showing a score, a commentary or the like by an author, and the like that correspond to a music piece; or causes sounds of respective musical instruments that compose the music piece, a commentary or the like by an author, etc. to be output with sounds.

Further, in the case where the portable telephone terminal 20 has a function of automatically executing a file attached to a message, it is possible that the server 1 attaches an image (moving image, still image) file, a sound file, etc. to a message, and when the portable telephone terminal 20 receives the message, images are displayed automatically on the display section 22 or sounds are output from its speaker automatically. In the case where the portable telephone terminal 20 does not have a function of automatically executing a file attached to a message, the configuration is preferably such that after receiving a message, the portable telephone terminal 20 executes an image file or a sound file attached to the message by an operation by the user. Further, in the case where the portable telephone terminal 20 does not have a function of automatically executing a file attached to a message, the configuration is preferably such that the server 1 writes, in a message, an URL where an image file or a sound file is stored and transmits the message to the portable telephone terminal 20; then the user makes access to the URL written in the message by operating the portable telephone terminal 20, so as to download the image file or the sound file into the portable telephone terminal 20 and execute the same. Further, it is preferable that the server 1 sends out signals for a phone call to the portable telephone terminal 20, and the portable telephone terminal 20 receives the signals for a phone call from the server 1, whereby the server 1 transmits a sound signal to the portable telephone terminal 20 and a sound based on the sound signal is output from a speaker provided in the portable telephone terminal 20. Still further, in the case where a message receivable by the portable telephone terminal 20 is, for example, a message in the HTML (hyper text markup language) form, the server 1 embeds images based on an image file or sounds based on a sound file in a message and transmits the message to the portable telephone terminal 20, so that images or sound can be displayed or output by the portable telephone terminal 20. Further, in the case where the portable telephone terminal 20 has a function of displaying an always-on still image (so-called "standby display") on the display section 22 in a communication standby state of the portable telephone terminal 20, preferably the configuration is such that when transmitting a message with an image file (still image) attached thereto to the portable telephone terminal 20, the server 1 executes a control operation for causing the standby display in the portable telephone terminal 20 to be changed to the still image based on the attached image file. Still further, in the case where the ring tone of the portable telephone terminal 20 is changeable, the server 1, when transmitting a message with a sound file attached thereto to the portable telephone terminal 20, preferably executes a control operation for causing the ring tone set at the portable telephone terminal 20 to be changed to a sound based on the attached sound file.

The reproduction progress monitor section 4 refers to information of a reproduced page sent from the reproduction progress transmission section 15, and when detecting that a reproduced page in the content is a page designated by the "transmission timing" described in message management information shown in FIG. 5 (Yes at S5), the reproduction progress monitor section 4 sends a message transmission instruction to the message transmission section 6 that instructs the message transmission section 6 to send the message described in message management information to the portable telephone terminal 20. The message transmission section 6, when receiving a message transmission instruction, transmits a message described in a "contents of message" described in the message management information to the portable telephone terminal 20 in, for example, a mail form. The address as destination of transmission is a mail address contained in user information of the user who is reproducing the content (S8).

Next, when a reproduction end instruction is input from the content watching terminal 10 (S6), the server 1 causes the reproduction of the content at the content watching terminal 10 to end. The reproduction end instruction for the content is transmitted from the content watching terminal 10 to the server 1, for example, when the user stops the action of reproducing the content at an arbitrary timing while the content is being reproduced, when the action of reproducing the content, in temporary transition, reaches the end, or the like (S7).

With the above-described action of the server 1, while the user is reproducing the content by using the content watching terminal 10, a message is transmitted to the portable telephone terminal 20 at a transmission timing described in content information. For example, when the user browses a novel with the content watching terminal 10 and causes the display section 12 to display a page in which a character in the novel says some words, the server 1 transmits a message that describes characters representing the words to the portable telephone terminal 20. When receiving the message, the portable telephone terminal 20, for example, outputs a preliminarily set ring tone from a speaker, causes a vibration motor incorporated therein to operate, or the like, to inform the user of the reception of the message. The user recognizes that the portable telephone terminal 20 has received the message, and carries out a predetermined operation with the operation section 21, so as to browse contents of the message displayed on the display section 22.

The device collaboration system according to the present embodiment utilizes alternate reality obtained by replacing a part of a virtual world with reality, as described above. For example, in the present embodiment, an electronic book corresponds to the virtual world, and the situation in which the portable telephone terminal 20 receives a message corresponds to reality. Therefore, the user who utilizes this system can feel both a sense of virtuality of watching a content such as an electronic book or the like using the content watching terminal, and a sense of reality of receiving a message relating to contents of the content using the portable telephone terminal 20.

2. Effects of Embodiment, etc.

With the device collaboration system of the present embodiment, while a user is reproducing a content by using the content watching terminal 10, a message containing contents relating to the content is transmitted to the portable telephone terminal 20. With such a configuration, the user can browse the message, together with the content, thereby feeling alternate reality. Thus, the enjoyment upon the content reproduction can be increased. In other words, while a user is reproducing a content with the content watching terminal 10, the portable telephone terminal 20 makes an action that the user has not expected, whereby the enjoyment upon content reproduction can be increased.

It should be noted that the "unexpected action" means an action of a device that is beyond a user's supposition. For example, JP2006-196956A discloses a configuration in which a scenario for a device executing an arbitrary action (e.g., turning on a light at a kitchen) is set preliminarily by a user, and an event of "a sensor at an entrance hall turning on"

is set as an event that activates the scenario, whereby such a setting that the turning on of the sensor at the entrance hall leads to the turning on of the light at the kitchen can be achieved. The action disclosed in the above-described publication does not correspond to the "unexpected action" in the present embodiment, since the user sets contents of an event and contents of a scenario that cause the event to occur.

On the other hand, the "unexpected action" in the present embodiment is an action executed in order to pull a user back to the real world sensately (an action beyond the user's supposition) when the user is watching a content with the content watching terminal 10 and entering the story of the content sensately. For example, in the case where the user is watching a content (e.g. an electronic book) with the content watching terminal 10 according to the present embodiment, the user is reading the electronic book while understanding that the story described in the electronic book is developed only in the content watching terminal 10. In this state, when receiving a message from the server 1 with the portable telephone terminal 20 independent from the content watching terminal 10, the user knows the reception of a message by the portable telephone terminal 20, with a ring tone or the like generated by the portable telephone terminal 20. Upon the timing of knowing the reception of the message, the user leaves the world of the story of the content that he/she is watching with the content watching terminal 10, and is pulled back to sensate reality. Receiving the message relating to the world of the story of the content with the portable telephone terminal 20 in this state, the user receives a feeling of ambiguity of the boundary between the virtual world and the real world (illusion) via the portable telephone terminal 20 as a real communication means, thereby feeling increased realistic sensations.

Further, with this simple configuration using the portable telephone terminal 20, it is possible to allow a user to feel alternate reality. Though the configuration of the present embodiment is such that the server 1 transmits a message to the portable telephone terminal 20, the configuration may be at least such that a message is transmitted to a communication terminal independent from the content watching terminal 10.

Still further, it is possible to increase the sensations of alternate reality, by realizing the server 1 with a portable telephone terminal via a SNS server that is utilized as a general communication tool. In other words, alternate reality allows a user to have sensations as if a virtual world exists in reality, by using a daily information conveying means such as a telephone, and therefore, by using an information convey means that a user daily uses, such as a SNS server or a portable telephone terminal, as a contact point between the device collaboration system and the user, a feeling closer to alternate reality can be given to the user.

Though a case where an electronic book is used as a content is explained as an exemplary case of the present embodiment, the present configuration can be applied to another content. Exemplary types of a content include a moving image, sound, a newspaper, or a game. For example, in the case where a content is composed of a moving image and a sound, a message can be transmitted to the portable telephone terminal 20 at a predetermined timing (reproduction time, frame, bar, etc.) of the moving image.

The configuration of the present embodiment is such that the server 1 transmits a message containing characters that can be received and displayed by the portable telephone terminal 20, at a predetermined timing, but in the case where the portable telephone terminal 20 is provided with a speaker, the configuration may be such that the server 1 executes a controlling operation so as to cause the speaker to emit a ring tone; or in the case where the portable telephone terminal 20 incorporates a vibration motor, the configuration may be such that the server 1 causes the vibration motor to work so as to cause the portable telephone terminal 20 itself to vibrate. In other words, while a user is reproducing a content (virtual world) to be reproduced by the convent watching terminal 10, the present system causes the portable telephone terminal 20 to work at a predetermined time, so as to pull the user back to reality.

Further, in the present embodiment, the message transmission timing is a timing described in content information, which is set by the server 1, but it may be a timing before or after the timing described in the content information.

Further, the transmission timing may be a timing when a user ends reproduction of a content after the reproduction of a predetermined portion of the content (the predetermined portion is designated by the "transmission timing" described in the content information) with the content watching terminal 10. It should be noted that "a timing when a user ends reproduction of a content" can be, for example, a timing when the action of reproducing the content is ended forcibly by the user. Further, "a timing when a user ends reproduction of a content" can be, for example, a timing when, during reproduction of a content that is carried out by activating a content reproduction application with a content watching terminal in which the content reproduction application is installed, the content reproduction application is ended. Still further, "a timing when a user ends reproduction of a content" can be, for example, a timing when the content watching terminal is turned off during reproduction of a content. Still further, "a timing when a user ends reproduction of a content" can be, for example, a timing when, in a content watching terminal corresponding to multitask (a function for causing a plurality of applications to start and operate at the same time), the operation is switched from a state in which the content reproduction application is being activated, to another application. Still further, "a timing when a user ends reproduction of a content" can be, for example, in the case where, for example, the content watching terminal or the content reproduction application has a suspension function (temporarily stopping function), a timing when the content watching terminal or the content reproduction application is shifted to a suspension state by an operation by a user. Still further, "a timing when a user ends reproduction of a content" can be, for example, a timing when, during reproduction of a content that progresses temporally, such as a moving image or music, the action of reproducing the content temporally reaches the end. Still further, "a timing when a user ends reproduction of a content" can be, for example, a timing when the network connection between the content watching terminal and the server becomes discontinuous. It should be noted that the server 1 may transmits a message at any timing among the above-described various timings, as the message transmission timing, or may transmit a message at all timings.

Still further, the message transmission timing may be a timing after a certain time elapses after a user starts the reproduction of a predetermined portion of a content (the predetermined portion is designated by the "transmission timing" described in the content information) with the content watching terminal 10.

Still further, the message transmission timing may be a preliminarily set time after a user starts the reproduction of a predetermined portion of a content (the predetermined portion is designated by the "transmission timing" described in the content information) with the content watching terminal 10.

Still further, the message transmission timing may be a timing synchronized with a user's schedule after the user has reproduced a predetermined portion of a content (the predetermined portion is designated by the "transmission timing" described in the content information) with the content watching terminal 10. For example, in the case where the server 1 is formed with a SNS server, a user's schedule can be registered. This configuration may be such that the server refers to the user's schedule thus registered, and transmits a message during a time when no plan is registered. It should be noted that if a user can manage his/her schedule, the server 1 does not have to be a SNS server. The server 1 may be formed with, for example, a groupware server.

It should be noted that the message transmission timing is preferably while a user is logging in a SNS server, or within a predetermined time after logging out. Since in this case the possibility that the user has the portable telephone terminal 20 with him/herself is high, the user immediately can receive the message, and a phenomenon that the user has not expected can be caused to occur easily. In the case where the server 1 can detect that the user has the portable telephone terminal 20 with him/herself based on output information from a sensor provided in the portable telephone terminal 20, the server 1 can transmit a message surely when the user has the portable telephone terminal 20 with him/herself.

Still further, a message transmitted to the portable telephone terminal 20 once preferably is not transmitted a second time to the portable telephone terminal 20 during a predetermined period. In other words, when a message is transmitted to the portable telephone terminal 20 and a user checks contents of the message received by the portable telephone terminal 20, the user knows the contents of the message. Then, when the same content as the content reproduced at the previous time is reproduced, in the case where the user remembers the timing of message transmission to the portable telephone terminal 20, the user can expect the timing at which the portable telephone terminal 20 receives a message, and the realistic sensations decrease. Therefore, it is preferable that the server 1 stores the timing (date, time, etc.) of transmitting a message to the portable telephone terminal 20, and does not transmit a message during a preliminarily set period (e.g., one month) after the message is transmitted once, even if the user watches the same content. It should be noted that the server 1 may limit the transmission of a message, not during a preliminarily set period, but based on the number of times of reproduction of the content. Alternatively, the server 1 may refrain from second transmission of a message after the message is transmitted once.

Further, GPS (global positioning system) antennas may be mounted on the content watching terminal 10 and the portable telephone terminal 20, respectively. In this case, for example, the server 1 has to be provided with a current position obtaining section that is capable of obtaining respective current positions based on GPS data from the content watching terminal 10 and the portable telephone terminal 20. The server 1 is preferably configured to grasp a current position of the content watching terminal 10 and a current position of the portable telephone terminal 20, and transmit a message to the portable telephone terminal 20 when a physical distance between the two is less than a predetermined value. More specifically, since the effects of the present system can be achieved when the portable telephone terminal 20 is positioned close to a user (e.g., at a position visible from the user) who reproduces a content with the content watching terminal 10, it is preferable that the server 1 can transmit a message to the portable telephone terminal 20 when a physical distance between the content watching terminal 10 and the portable telephone terminal 20 is less than a predetermined value as described above.

It should be noted that in the case where the content watching terminal 10 and the portable telephone terminal 20 are formed with one terminal, the configuration is preferably such that a message can be transmitted when a current position of the terminal is within a predetermined range. For example, in the case where a position of a user's home can be recognized, the server 1 can transmit a message in the case where the terminal is positioned in a predetermined range of a distance from the position of the home.

Further, the server 1 can be configured to record message transmission history. The server 1 can have the following configuration: once a message is transmitted, the server 1 does not transmit a message even if the same requirements are satisfied. For example, the server 1 may include a transmission history management section that manages message transmission history as control signals per portable telephone terminal 20. In this case, the server 1 can control message transmission so as not to transmit the same message to the same portable telephone terminal 20, based on the transmission history of the transmission history management section.

The message transmission timing may be a timing according to a weather condition at a place where a user is present currently, after the user reproduces a predetermined portion of a content with the content watching terminal 10. For example, the server 1 can obtain a current position based on GPS data from the content watching terminal 10 or the portable telephone terminal 20, from the above-described current position obtaining section. It should be noted that a place where a user is present is preferably obtained from a current position of the portable telephone terminal 20.

In this case, the server 1 preferably includes a weather condition obtaining section for obtaining a weather condition at the current position thus obtained. For example, the weather condition obtaining section can be configured to be communicable with a weather server (not shown) that outputs the latest weather condition data at the current position in response to an input of the current position. This allows the server 1 to transmit a message in the case where the server 1 can determine that the weather conditions at the user's current position satisfy predetermined weather requirements, based on the weather condition data obtained from the weather server. It should be noted that the server 1 is capable of obtaining temperature, humidity, atmospheric pressure, precipitation amount, wind direction, wind speed, accumulation of snow, weather advisory (strong wind advisory, heavy rain advisory, heavy snow advisory, dense fog advisory, thunderstorm advisory, etc.), and the like, as weather condition data.

For example, after a user watches a content of a horror movie that includes a scene of humid, hot, rainy day, the server 1 transmits a message that can give a feeling of fear to the portable telephone terminal 20, in the case where the weather conditions of the user's position information satisfy a weather requirement of "temperature: 25° C. or above, humidity: 70% or more, and precipitation amount per hour: 30 mm or more". Since the user is present in environments similar to those in the horror movie that he/she has watched, alternate reality tends to be generated easily, and the user who watches this message can have a more real feeling of fear. In other words, the user can feel an illusion as if the story of the virtual world of the horror movie would link to the real world.

In the case where options that require a user to make a selection operation are contained in a content reproducible with the content watching terminal 10, an option may be selected from a message received by the portable telephone terminal 20. In this case, one is selected out of options contained in one content (e.g., options corresponding to several scenarios in a multiscenario) by the portable telephone terminal 20, and thereafter a content (scenario) corresponding to the selected option is distributed by the server 1 to the content watching terminal 10. It should be noted that a content containing options is a content corresponding to a multiscenario. The "content corresponding to a multiscenario" is a content of a book, a game, or the like that is configured to have a different scenario according to contents of an option selected by a user out of a plurality of options given to the user in a story. In other words, a content corresponding to a multiscenario contains a plurality of scenarios corresponding to contents of selectable options.

It should be noted that as a method for selecting an option, the following method is available: an URL (link) for making access to a predetermined site is described in a message transmitted from the server 1 to the portable telephone terminal 20, so that a user is allowed to make access to the site, and to select an option in the site. As a method for selecting an option, a method is available in which to the message transmitted from the server 1, a user replies a message describing an arbitrary option by operating the portable telephone terminal 20.

Figure 6:
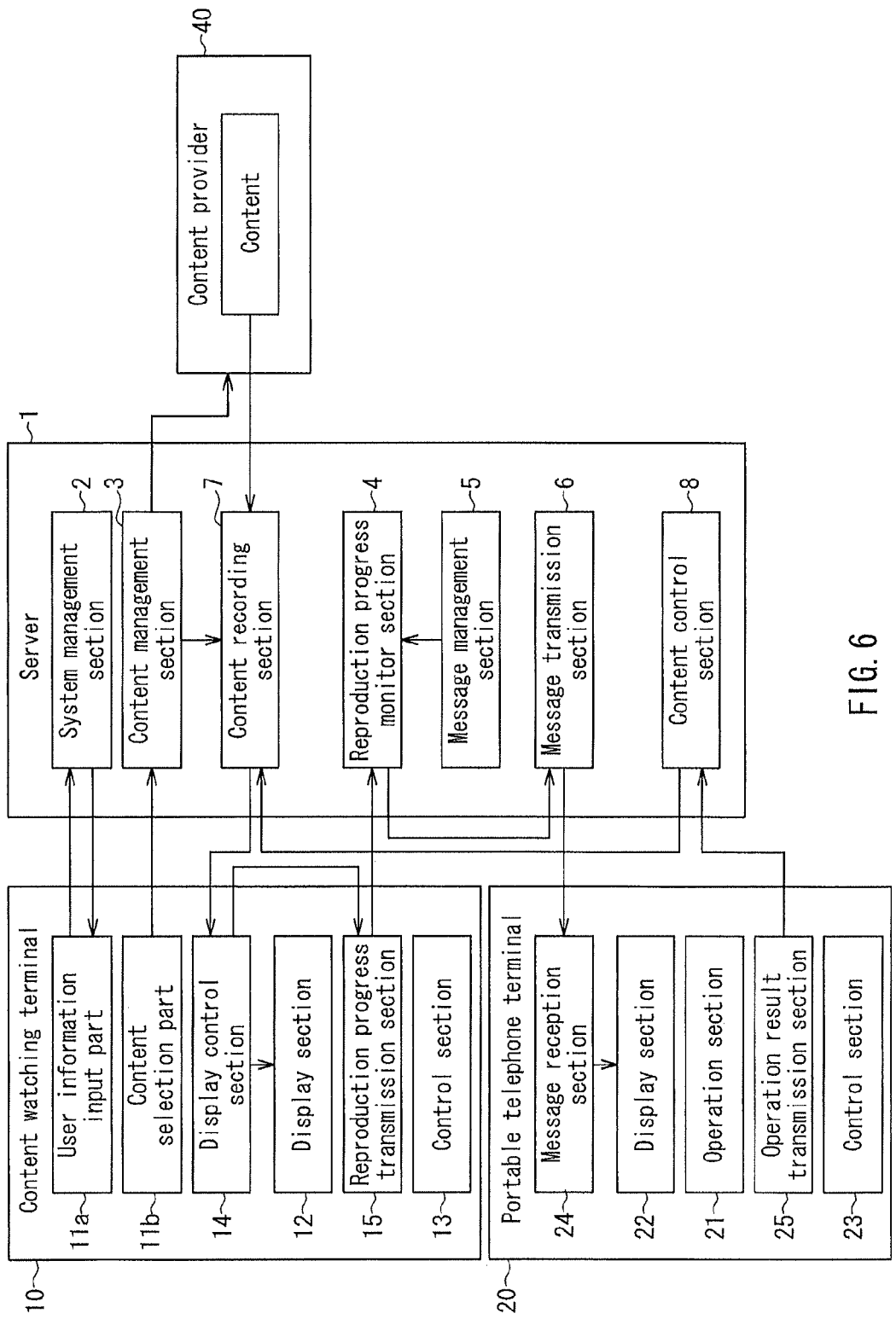
FIG. 6 is a block diagram showing a modification of the device collaboration system.

As described above, in order for an option to be selected in a message received by the portable telephone terminal 20, the device collaboration system may have a configuration as shown in FIG. 6, for example. FIG. 6 is an exemplary modification of the device collaboration system. The configuration shown in FIG. 6 is different from that shown in FIG. 2 in that a content control section 8 is added to the server 1, and an operation result transmission section 25 is added to the portable telephone terminal 20. The operation result transmission section 25 can accept an selecting operation by a user, when the message reception section 24 receives a message transmitted from the server 1 and the display section 22 displays options contained in the message. The operation result transmission section 25 transmits contents of an option selected by a user to the content control section 8. The content control section 8, upon receiving selection contents transmitted from the operation result transmission section 25, controls the content recording section 7 so that a scenario of a content that is being reproduced matches the contents of the selected option.

Figure 7:
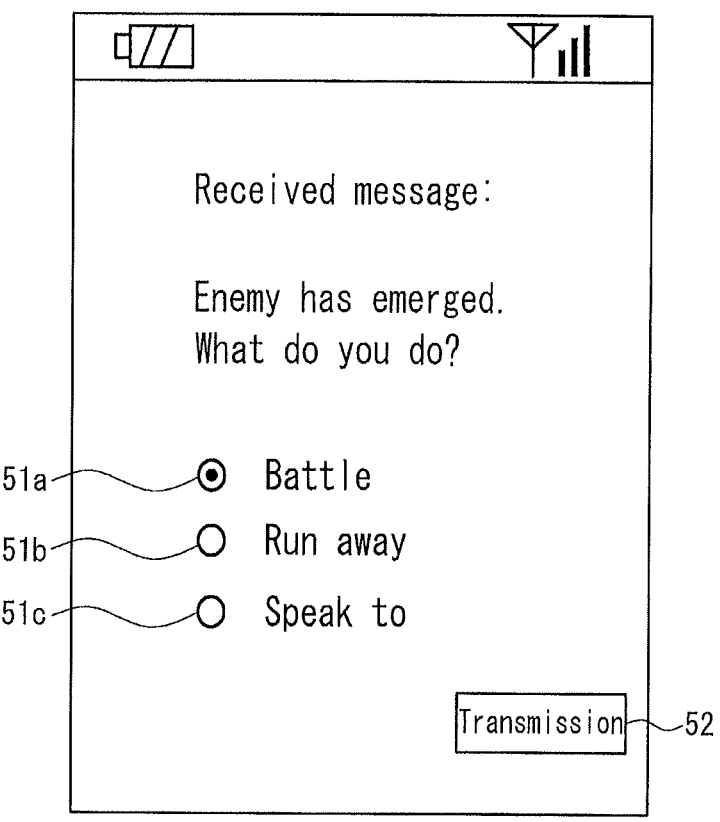
FIG. 7 schematically shows an exemplary message displayed on a portable telephone terminal.

For example, while an electronic book about a story of an adventure of a lead character is being reproduced with the content watching terminal 10, when the display control section 14 causes the display section 12 to display a scene (page) where an enemy appears in front of the lead character, the reproduction progress transmission section 15 sends information about the scene (page) to the reproduction progress monitor section 4. The reproduction progress monitor section 4 obtains a message corresponding to the scene (page) from the message control section 5. The reproduction progress monitor section 4 sends a message transmission instruction to the message transmission section 6. The message transmission section 6 transmits a message to the portable telephone terminal 20 based on the transmission instruction from the reproduction progress monitor section 4. The message reception section 24 receives a message transmitted from the message transmission section 6, and causes the display section 22 to display the message. Here, the message displayed on the display section 22 has contents that contain options as shown in FIG. 7, for example. FIG. 7 shows an exemplary message displayed on the display section 22 of the portable telephone terminal 20, which is, for example, a message described in the HTML form. It should be noted that the message may be described in the text form. In this case, the configuration is made such that the server 1 describes, on a message, a URL of a site that describes contents shown in FIG. 7, and transmits the message to the portable telephone terminal 20, so as to allow access to the site via the portable telephone terminal 20. With this configuration, the window shown in FIG. 7 can be displayed on the display section 22 of the portable telephone terminal 20.

The user operates the operation section 21 so as to designate an arbitrary radio button among radio buttons 51a to 51c described in the message shown in FIG. 7 in a selected state (a solid circle in the drawing is the selected radio button), and the operation button corresponding to a transmission icon 52 contained in the operation section 21 is pressed down. With this, the operation result transmission section 25 transmits information about the contents of the option selected in the message shown in FIG. 7, to the server 1. The content control section 8 of the server 1 selects one of a plurality of scenarios contained in the content, according to the information about the contents of the selected option transmitted from the operation result transmission section 25. In other words, the content has scenarios corresponding to, for example, the radio buttons 51a to 51c, respectively, in the message shown in FIG. 7, and the server 1 transmits a scenario corresponding to contents of a selected one of the radio buttons 51a to 51c, to the content watching section 10.

Further, in the case where a content reproducible by the content watching terminal 10 contains contents that require a user to input a response, the configuration may be such that the server 1 alters scenarios of the multiscenario content depending on a time required from the reception of the message by the portable telephone terminal 20 to the user's operation for response with the portable telephone terminal 20, or a date and a time at which a user carries out a responding operation with the portable telephone terminal 20. The configuration may be such that the server 1 alters the scenarios based on dynamic information about a user, for example, the user's step information about the number of steps counted by a pedometer in the case where the pedometer is installed in the portable telephone terminal 20, or the user's motion amount information measured based on the current position information received by a GPS antenna in the case where the GPS antenna is installed in the portable telephone terminal 20. Further, the configuration may be such that the server 1 alters the scenarios based on information about user's health conditions, such as a weight, a blood pressure, a blood glucose level, etc. measured by the portable telephone terminal 20 or input by a user operating the portable telephone terminal 20.

3. Modification Example 1

In the action flow of the server 1 shown in FIG. 3, when detecting that the currently reproduced page in the content is the page designated by the part of the "transmission timing" described in the message management information shown in FIG. 5 (Yes at S5), the reproduction progress monitor section 4 sends a message transmission instruction to the message transmission section 6. However, alternatively, the configuration may be such that in the case where the reproduction progress monitor section 4 determines, after determination of Yes at S5, determines that the transmission requirement corresponding to the transmission timing detected are satisfied, the reproduction progress monitor section 4 sends a message transmission instruction to the message transmission section 6. The following description will explain a modification example of the processing operation by the reproduction progress monitor section 4.

In the present modification example, the server 1 uses a timing described in content information as a trigger, and after detecting this trigger, transmits a message in the case where a transmission requirement corresponding to the trigger detected is satisfied. For example, the determination on whether or not the above-described transmission requirement is satisfied can be carried out based on state information indicating a state of the portable telephone terminal 20.

Figure 8:
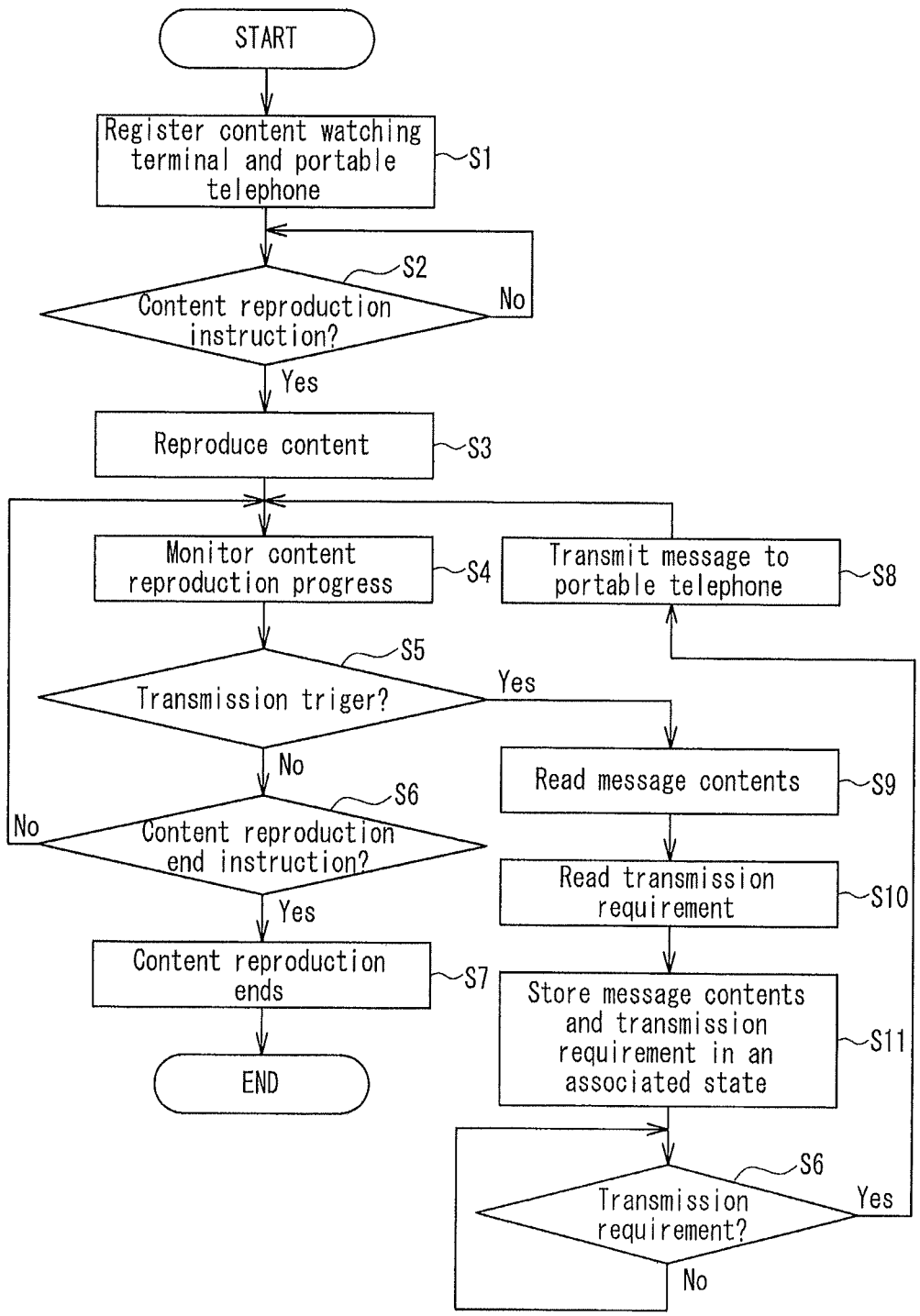
FIG. 8 is a flowchart showing actions of a device collaboration system in Modification Example 1.

FIG. 8 shows an action flow of the server 1 in the system of the present modification example. Since the processing contents of S1 to S4 and S6 to S8 are identical to those explained with reference to FIG. 3, duplicate descriptions are omitted. The reproduction progress monitor section 4 refers to information about a reproduced page sent from the reproduction progress transmission section 15, and determines whether or not the currently reproduced page in the content is the page designated by the "transmission trigger" described in message management information shown in FIG. 9 (S5 in FIG. 8).

FIG. 9 shows exemplary message management information in the modification example. The message management information includes, for example, information about a transmission trigger of a message, contents of the message, and a transmission requirement code. The transmission requirement code is an identification code in correspondence to a transmission requirement. The transmission requirement is a specific requirement for determination about whether or not a message is to be transmitted. The transmission requirement codes and the transmission requirements are made to correspond to each other, respectively, and are managed as transmission requirement information, for example, as shown in FIG. 10. It should be noted that the transmission requirement information is created preliminarily by, for example, the content provider 40 per content dealt with by the present system, and is stored in a storage medium in the server 1, as is the case with the message management information.

The reproduction progress monitor section 4 refers to information of a reproduced page sent from the reproduction progress transmission section 15, and when detecting that the currently reproduced page of the content is the page designated by the "transmission trigger" described in the message management information shown in FIG. 9 (Yes at S5 in FIG. 8), the contents of the message corresponding to the detected page are read out of the message management information (S9). The reproduction progress monitor section 4 reads a transmission requirement based on a transmission requirement code corresponding to the detected page, from the message management information (S10). The reproduction progress monitor section 4 stores the contents of the message thus read, temporarily in a memory (not shown) of the server 1, in a state of being associated with the transmission requirement.

The reproduction progress monitor section 4 determines whether or not the transmission requirement, which is stored temporarily, is satisfied (S12). The determination of whether or not the transmission requirement is satisfied or not at the step S12 is carried out based on whether or not the state information indicating a state of the portable telephone terminal 20 matches the transmission requirement. The state information indicates, for example, a weather condition at a position where the portable telephone terminal 20 is present, a reproduction state of the content reproduced at the portable telephone terminal 20, etc.

For example, in the case where the transmission trigger is "Page 130" denoted by 91 as shown in FIG. 9, the transmission requirement code corresponding thereto is "TM07" denoted by 92. Therefore, the reproduction progress monitor section 4 stores "temperature: 25° C. or higher, humidity: 70% or more, and precipitation per hour: 30 mm or more" denoted by 102, as the transmission requirement corresponding to "TM07" denoted by 101, as shown in FIG. 10. The reproduction progress monitor section 4 obtains weather condition data from a weather server (not shown), based on the current position obtained from the portable telephone terminal 20, using the above-described current position obtaining section. Subsequently, the reproduction progress monitor section 4 determines whether or not the obtained weather condition data match the transmission requirement of "temperature: 25° C. or higher, humidity: 70% or more, and precipitation per hour: 30 mm or more" denoted by 102.

In the case where the weather condition data match the transmission requirement "TM07" denoted by 92, the reproduction progress monitor section 4 sends a message transmission instruction to the message transmission section 6, so as to send a message described in message management information to the portable telephone terminal 20 (S8). After sending the message transmission instruction to the message transmission section 6, the reproduction progress monitor section 4 deletes the contents of the message and the transmission requirement stored temporarily in a memory or the like.

It should be noted that though a single transmission requirement code is described in correspondence to a single transmission trigger in FIG. 9, a plurality of transmission requirement codes may correspond to a single transmission trigger. In this case, the reproduction progress monitor section 4 determines whether or not data match the transmission requirements corresponding to all the transmission requirement codes.

Further, in the case where there are a plurality of transmission triggers, the reproduction progress monitor section 4 preferably executes a processing corresponding to the latest transmission trigger, and cancel processings corresponding to all the other transmission triggers. In the case where a user watches contents of a plurality of series continuously, the reproduction progress monitor section 4 preferably executes a processing corresponding to a transmission trigger of the latest series, and cancels processings corresponding to the transmission triggers of the other series. This makes it possible to transmit only a message corresponding to the state of progress in the user's content watching.

Further, as fields to which the present modification example can be applied, the following can be considered.

For example, in the case where a user read a certain novel content partially and thereafter the same novel content has not been read by the same user for a certain period, if this matches a transmission requirement of no access to the novel content for a certain period, the present system can transmit a message for prompting the user to read more of the novel content, to the user's portable telephone terminal 20.

In the case where the content watching terminal 10 and the portable telephone terminal 20 are formed with one terminal (e.g., a television receiver), the present system is capable of causing the terminal to display an advertisement relating to a content watched by the terminal. For example, in the case where the content is a football game, the present system causes the terminal to display an advertisement relating to football. This allows a user, in a state of excitement about the football game, to watch the advertisement relating to football, with interest. For example, in the case where the content is a movie, an advertisement that features a character that appears in the movie is displayed preferentially. This allows a user, in a state of excitement about the movie, to watch the advertisement in which the character in the movie appears, with interest.

4. Modification Example 2

In the above-described modification example 1, the configuration is such that the processing of determining whether or not the transmission requirement is satisfied is executed on the server 1 side, but the configuration may be modified so that the processing of determining whether or not the transmission requirement is satisfied (S12 in FIG. 8) is executed, for example, on the portable telephone terminal 20 side. The following describes another modification example of the processing by the reproduction progress monitor section 4.

In the present modification example, the server 1 uses a timing described in content information as a trigger, and after detecting this trigger, transmits a transmission requirement and a message to the portable telephone terminal 20. The portable telephone terminal 20 displays a message in the case where transmission requirement received from the trigger is satisfied. For example, the determination on whether or not the above-described transmission requirement is satisfied or not can be carried out based on state information indicating a state of the portable telephone terminal 20.

Figure 11:
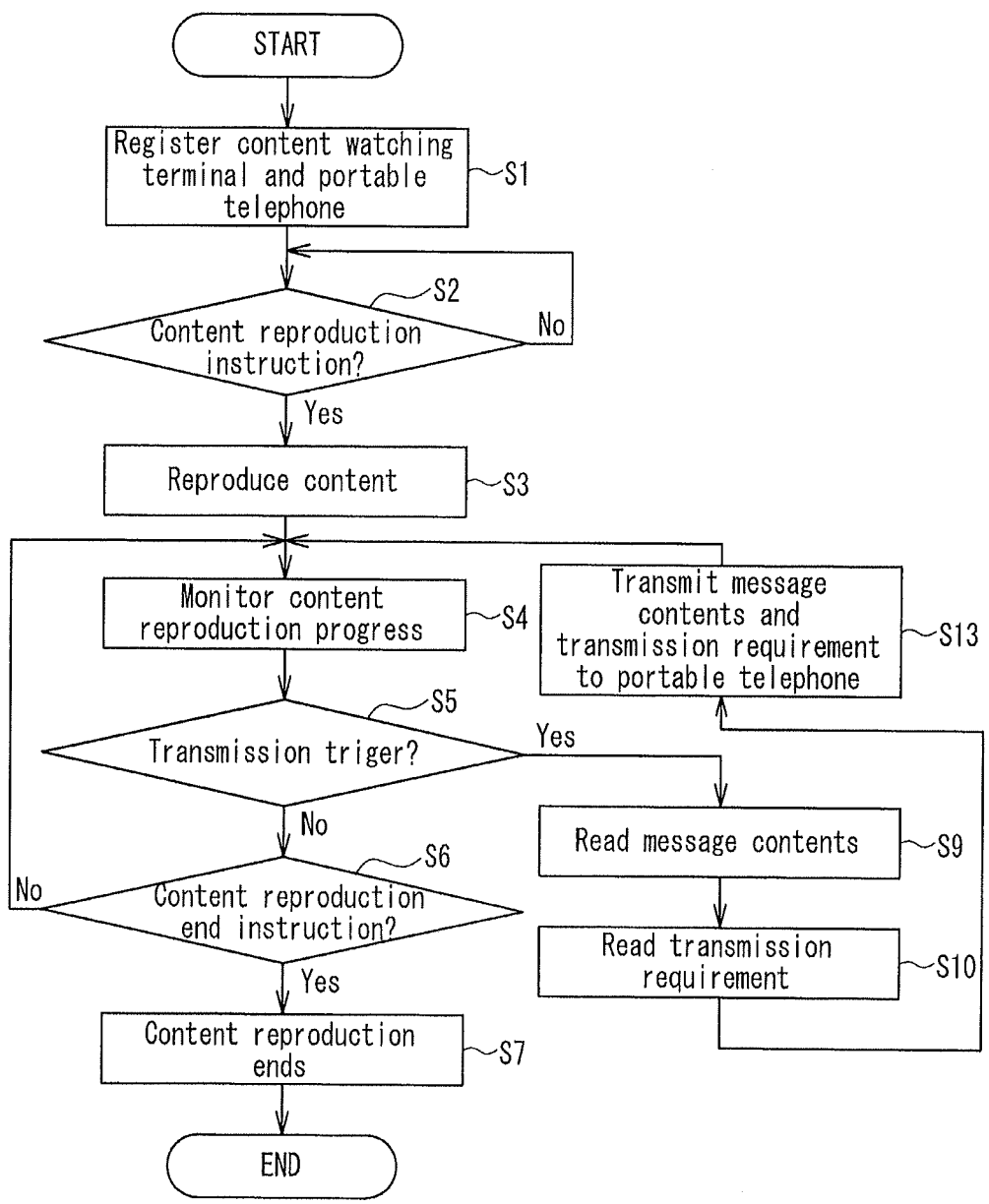
FIG. 11 is a flowchart showing actions of a device collaboration system in Modification Example 2.

FIG. 11 is an action flow of the server 1 in the system of the present modification example. Since the processing contents of the steps S1 to S4 and S6 to S7 are identical to those explained with reference to FIG. 3, duplicate descriptions are omitted. Likewise, since the contents of the processings at the steps S5, S9, and S10 are identical to those explained with reference to FIG. 8, duplicate descriptions are omitted.

The reproduction progress monitor section 4 refers to information about a reproduced page sent from the reproduction progress transmission section 15. When detecting that the currently reproduced page in the content is the page designated by the "transmission trigger" described in message management information shown in FIG. 9 (Yes at S5 in FIG. 8), the reproduction progress monitor section 4 reads contents of a message corresponding to the detected page, from message management information (S9). The reproduction progress monitor section 4 reads a transmission requirement based on a transmission requirement code corresponding to the detected page, from the transmission requirement information (S10). The reproduction progress monitor section 4 sends, to the message transmission section 6, a message transmission instruction for transmitting the contents of the message and the transmission requirement thus read out to the portable telephone terminal 20 (S13).

Figure 12:
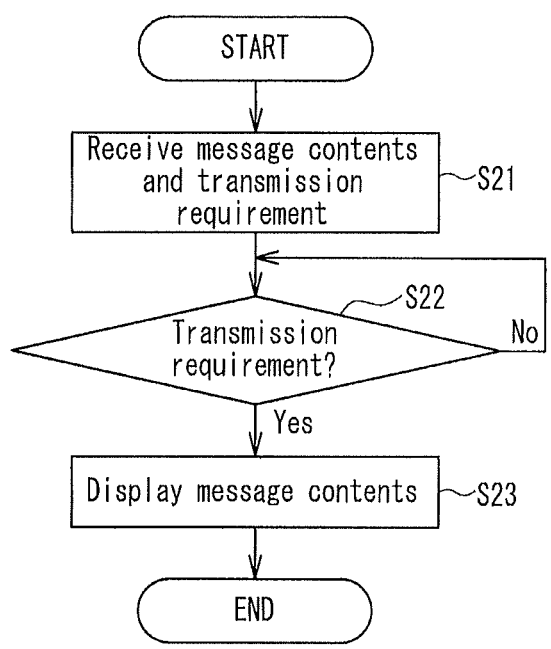
FIG. 12 is a flowchart showing actions of a device collaboration system in Modification Example 2.

FIG. 12 shows an action flow of the portable telephone terminal 20 in the present system according to the present modification example. The message reception section 24 of the portable telephone terminal 20 receives contents of a message and a transmission requirement from the server 1 (S21). The message reception section 24 determines whether or not the transmission requirement thus received is satisfied (S22).

The determination of whether or not the transmission requirement is satisfied at the step S22 is executed based on whether or not state information indicating a state of the portable telephone terminal 20 matches the transmission requirement. For example, the transmission requirement is "temperature: 25° C. or higher, humidity: 70% or more, and precipitation per hour: 30 mm or more" denoted by 102 as shown in FIG. 10, the message reception section 24 transmits it's position information and obtains weather condition data from a weather server (not shown), and thereafter determines whether or not the obtained weather condition data mach the transmission requirement. It should be noted that in the case where the portable telephone terminal 20 is provided with a sensor that is capable of detecting weather condition data, the determination about whether or not weather condition data match the transmission requirement may be executed based on outputs of the sensor.

The message reception section 24 causes the display section 22 to display a received message in the case where it determines that the received transmission requirement is satisfied (S23).

5. Others

The present embodiment is described with reference to the case where the terminal capable of receiving a message transmitted from the server 1 is the portable telephone terminal 20, but such a terminal is not limited to a portable telephone terminal as long as the terminal is at least capable of receiving and displaying a message transmitted from the server 1. For example, the terminal may be a content watching terminal or a notebook-size personal computer that has a communication function, besides the portable telephone terminal 20.

In the case where the portable telephone terminal 20 has a content reproduction function and the content watching terminal 10 has a message reception function, a system can be realized in which a content is reproduced by the portable telephone terminal 20 and a message is received by the content watching terminal 10.

Alternatively, both of the terminal that reproduces a content and the terminal that receives and displays a message may be content watching terminals, or both of them may be portable telephone terminals.

The server 1 may be configured to make the following control operation: a user is prevented from receiving a message transmitted from another user with the portable telephone terminal 20 while the content watching terminal 10 is reproducing a content, or even if it is received, the arrival of the mail is not informed to the user. This makes it possible to prevent the reproduction of a content by a user from being hindered by the reception of a message transmitted from another user.

The server 1 in the present embodiment is an exemplary server. The content watching terminal 10 in the present embodiment is an exemplary first communication terminal. The portable telephone terminal 20 in the present embodiment is an exemplary second communication terminal. A message transmitted from the server 1 to the portable telephone terminal 20 in the present embodiment is an exemplary control signal.

It should be noted that the first communication terminal is not limited to the content watching terminal 10, but may be realized with a television receiver. The second communication terminal is not limited to the portable telephone terminal 20, but may be realized with an information communication terminal, or a remote controller. In this case, the television receiver is capable of reproducing a content transmitted from the server 1. The information communication terminal, or the remote controller is capable of receiving a message transmitted from the server 1, and either displaying contents of the message or outputting the same with sounds. It should be noted that the configuration may be such that the message is transmitted to the television receiver from the server 1 and is transmitted from the television receiver to the remote controller. This makes a configuration for connection to the server via the network unnecessary for the remote controller, and only a short-distance communication means (infrared communication, Bluetooth (registered trademark), etc.) capable of communicating with the television receiver may be provided. Thus, the configuration can be simplified. With this configuration, for example, when a content such as a movie is being reproduced by the television receiver; a message is transmitted from the server 1 to the information communication terminal or the remote controller at a timing preliminarily set by the server 1. Alternatively, a message is transmitted from the server 1 to the television receiver, and the message is transmitted from the television receiver to the remote controller. Since the remote controller capable of remotely controlling the television receiver is usually used at a position close to a user, the configuration of receiving a message with the remote controller allows a user to check the message. It should be noted that the television receiver is an exemplary content reproduction device. The remote controller is an exemplary operation device. The content reproduction device is not limited to a television receiver; a stereo unit or the like that is capable of reproducing a music content and being controlled remotely by a remote controller can be used as the content reproduction device.

The present invention is useful for a device collaboration system.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A device collaboration system, comprising:
a server device;
a first communication terminal capable of reproducing a content; and
a second communication terminal capable of receiving a control signal transmitted from the server device,
wherein the server device includes:
a monitor section configured to monitor whether or not the first communication terminal has reproduced a predetermined portion of a content;
a storage medium configured to store instruction information in a state of being associated with a transmission requirement when the monitor section detects that the first communication terminal has reproduced the predetermined portion of the content, the instruction information indicating instruction contents for causing the second communication terminal to execute a specific action; and
a transmission section configured to transmit a control signal based on the instruction information stored in the storage medium to the second communication terminal, in response to satisfaction of the associated transmission requirement, and
wherein the second communication terminal is configured to execute the specific action based on the control signal from the server device.

2. The device collaboration system according to claim 1, wherein the determination about whether or not the transmission requirement is satisfied is executed based on state information about a state of the communication terminal.

3. The device collaboration system according to claim 2, wherein the state information includes information that the reproduction of the content ends.

4. The device collaboration system according to claim 2, wherein the state information includes information that communication between the communication terminal and the server device is disconnected.

5. The device collaboration system according to claim 2, wherein the state information includes information that a preliminarily set time has elapsed.

6. The device collaboration system according to claim 2, wherein the server device is capable of managing a schedule of a user of the communication terminal, and
the state information includes information that the user's current schedule contents are specific contents.

7. The device collaboration system according to claim 2, wherein the server device includes a current position obtaining section configured to obtain a current position of the communication terminal, and
the state information includes information that the current position of the communication terminal is in a predetermined range.

8. The device collaboration system according to claim 2, wherein the server device includes a weather condition obtaining section configured to obtain a weather condition at a current position of the communication terminal, and
the state information includes information that the weather condition at the current position of the communication terminal satisfies a predetermined weather requirement.

9. The device collaboration system according to claim 1, wherein the determination about whether or not the transmission requirement is satisfied is executed based on state information about a state of the communication terminal,
the server device includes a current position obtaining section configured to obtain respective current positions of the first communication terminal and the second communication terminal, and
the state information includes information that a distance between the first and second communication terminals calculated based on the respective current positions of the first and second communication terminals is at a predetermined value or less.

10. The device collaboration system according to claim 1, wherein the determination about whether or not the transmission requirement is satisfied is executed based on state information about a state of the communication terminal,
the server device includes a weather condition obtaining section configured to obtain a weather condition at a current position of the second communication terminal, and
the state information includes information that the weather condition at the current position of the second communication terminal satisfies a predetermined weather requirement.

11. The device collaboration system according to claim 1, wherein the server device includes a transmission history management section configured to manage transmission history of the control signal per communication terminal, and
the server device executes a controlling operation for preventing the same control signal from being re-sent to the same communication terminal based on the transmission history.

12. The device collaboration system according to claim 1, wherein the control signal causes the communication terminal to execute an action in synchronization with contents of the content in a reproduction state of the content.

13. The device collaboration system according to claim 1, wherein the first communication terminal is capable of transmitting reproduction progress information about a content that is being reproduced to the server device, the server device manages information about a predetermined portion in the content, and contents of the control signal corresponding to the information about the predetermined portion, and the server device compares the reproduction progress information transmitted from the first communication terminal and the information about the predetermined portion, and when detecting that the first communication terminal has reproduced the predetermined portion in the content, the server device transmits the control signal to the second communication terminal.

14. The device collaboration system according to claim 1, wherein the server device includes a storage medium capable of storing the content, and the server device being configured to:

transmit the content stored in the storage medium to the first communication terminal, when a reproduction request for reproduction of the content is transmitted from the first communication terminal, monitor progress in the transmission of the content to the first communication terminal, and transmit the control signal to the second communication terminal when detecting that the first communication terminal has reproduced the predetermined portion of the content.

15. The device collaboration system according to claim 1, wherein, when receiving the control signal transmitted from the server device, the second communication terminal informs a user that it has received the control signal.

16. The device collaboration system according to claim 15, wherein the second communication terminal includes:

an operation section configured to accept an operation by the user; and an operation content transmission section configured to transmit information about contents of the operation of the operation section to the server device.

17. The device collaboration system according to claim 1, wherein the first communication terminal is a content watching terminal and the second communication terminal is a portable telephone terminal.

18. A device collaboration system, comprising:

a server device;

a first communication terminal capable of reproducing a content; and a second communication terminal capable of receiving a control signal transmitted from the server device, wherein the server device includes:

a monitor section configured to monitor whether or not the first communication terminal has reproduced a predetermined portion of a content; and a transmission section configured to transmit a control signal and a transmission requirement to the second communication terminal when the monitor section detects that the first communication terminal has reproduced the predetermined portion of the content, the control signal indicating instruction contents for causing the second communication terminal to execute a specific action, and wherein the second communication terminal is configured to execute the specific action based on the control signal from the server device, in response to satisfaction of the transmission requirement.

19. A server device communicable with a first communication terminal capable of reproducing a content and a second communication terminal capable of receiving a control signal, the server device comprising:

a monitor section configured to monitor whether or not the first communication terminal has reproduced a predetermined portion of a content;

a storage medium configured to store instruction information in a state of being associated with a transmission requirement when the monitor section detects that the first communication terminal has reproduced the predetermined portion of the content, the instruction information indicating instruction contents for causing the second communication terminal to execute a specific action; and a transmission section configured to transmit a control signal based on the instruction information stored in the storage medium to the second communication terminal, in response to satisfaction of the associated transmission requirement.

* * * * *